(12) United States Patent
Voss et al.

(10) Patent No.: US 10,794,591 B2
(45) Date of Patent: Oct. 6, 2020

(54) GAS INLET FIXTURE AND AIR SHUTTER

(71) Applicants: Roy N. Voss, Elgin, IL (US);
Mohammed Shoeb, Streamwood, IL (US)

(72) Inventors: Roy N. Voss, Elgin, IL (US);
Mohammed Shoeb, Streamwood, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 9 days.

(21) Appl. No.: 16/362,958

(22) Filed: Mar. 25, 2019

(65) Prior Publication Data
US 2019/0264909 A1    Aug. 29, 2019

Related U.S. Application Data

(62) Division of application No. 14/883,827, filed on Oct. 15, 2015, now Pat. No. 10,281,144.

(51) Int. Cl.
| | |
|---|---|
| *F23D 14/04* | (2006.01) |
| *A47J 37/07* | (2006.01) |
| *F23N 3/00* | (2006.01) |
| *F23D 14/10* | (2006.01) |
| *F23D 14/64* | (2006.01) |
| *F23D 14/26* | (2006.01) |
| *F23D 14/84* | (2006.01) |
| *F23N 1/00* | (2006.01) |

(52) U.S. Cl.
CPC .......... *F23D 14/04* (2013.01); *A47J 37/0713* (2013.01); *F23D 14/045* (2013.01); *F23D 14/105* (2013.01); *F23D 14/26* (2013.01); *F23D 14/64* (2013.01); *F23D 14/84* (2013.01); *F23N 1/007* (2013.01); *F23N 3/007* (2013.01); *F23D 2203/007* (2013.01)

(58) Field of Classification Search
CPC ...... F23D 14/04; F23D 14/045; A47J 37/0713
USPC ........................................................ 126/39 E
See application file for complete search history.

(56) References Cited

U.S. PATENT DOCUMENTS

| | | | |
|---|---|---|---|
| 592,545 A | 10/1897 | Grote | |
| 2,041,706 A | 5/1936 | Hahn | |
| 2,185,070 A | 12/1957 | Lamar | |
| 2,818,112 A * | 12/1957 | Wedlick | .................. F23D 14/26 431/349 |

(Continued)

FOREIGN PATENT DOCUMENTS

| | | |
|---|---|---|
| CN | 1646843 A | 7/2005 |
| CN | 101082424 A | 12/2007 |

(Continued)

OTHER PUBLICATIONS

CLA Grills & Service, copyright 2008 clagrills.com: web page, Help Center—Glossary of Terms, Adjustable air shutters.

(Continued)

*Primary Examiner* — Grant Moubry
*Assistant Examiner* — Aaron H Heyamoto
(74) *Attorney, Agent, or Firm* — Vitale, Vickrey, Niro & Gasey, LLP (57) ABSTRACT

A burner assembly including a gas inlet fixture for use with a burner tube, the gas inlet fixture including a plurality of tabs to engage a neck of a gas control valve to improve ignition and center the gas flow down the center of the burner tube.

7 Claims, 6 Drawing Sheets

(56) References Cited

U.S. PATENT DOCUMENTS

| | | | |
|---|---|---|---|
| 3,605,653 A * | 9/1971 | Donnell | F24B 15/005 |
| | | | 126/25 B |
| 4,118,175 A * | 10/1978 | Riehl | F23D 14/105 |
| | | | 431/354 |
| 4,416,249 A | 11/1983 | Reynolds | |
| 4,478,205 A | 10/1984 | Koziol | |
| 4,762,530 A * | 8/1988 | Koziol | A47J 37/0713 |
| | | | 126/41 R |
| 4,827,899 A * | 5/1989 | Walters | A47J 37/0713 |
| | | | 126/41 R |
| D326,031 S * | 5/1992 | Walters | D7/402 |
| 5,163,830 A | 11/1992 | Pfefferkom | |
| 6,102,029 A | 8/2000 | Stephen | |
| 6,450,800 B1 | 9/2002 | Cash | |
| 6,520,771 B1 | 2/2003 | Berry | |
| 6,793,487 B2 | 9/2004 | Hubbauer | |
| 8,336,534 B2 | 12/2012 | Irvin | |
| 8,770,632 B2 | 7/2014 | Zelek | |
| 9,739,483 B2 * | 8/2017 | Akbarimonfared | F24H 9/0052 |
| 2014/0199647 A1 | 7/2014 | Cadima | |
| 2015/0072296 A1 * | 3/2015 | Lundstrom | F23D 14/04 |
| | | | 431/215 |

FOREIGN PATENT DOCUMENTS

| | | |
|---|---|---|
| CN | 101666498 A | 3/2010 |
| CN | 101918765 A | 12/2010 |
| CN | 102365155 A | 2/2012 |
| CN | 204358306 U | 5/2015 |
| DE | 19612261 A1 | 10/1997 |

OTHER PUBLICATIONS

Extended European Search Report dated Feb. 17, 2017 in corresponding European Application No. 16193456.7.

Office Action and Search Report dated Jul. 13, 2017 in corresponding Taiwanese Application No. 105133339.

Office Action and Search Report dated Jun. 27, 2018 in corresponding Chinese Application No. 2016109012535.

* cited by examiner

GAS INLET FIXTURE AND AIR SHUTTER

This patent application is a divisional of U.S. patent application Ser. No. 14/883,827, filed on Oct. 15, 2015, currently pending and allowed and claims priority to such application. That disclosure is hereby expressly incorporated by reference as part of the present disclosure as if fully set forth herein.

FIELD OF THE INVENTION

The present inventions relate to burner tube assemblies for use on gas grills or other gas fired appliances. More particularly, the present inventions relate to burner tube gas inlet fixtures that are used to control the air-gas mixture going into burner tubes, provide positive contact with the gas control valve and/or center the gas flow into the center of the burner tube. The present inventions also provide burner tube gas inlet fixtures that may also function as air shutters.

BACKGROUND OF THE INVENTION

Figure 1A:
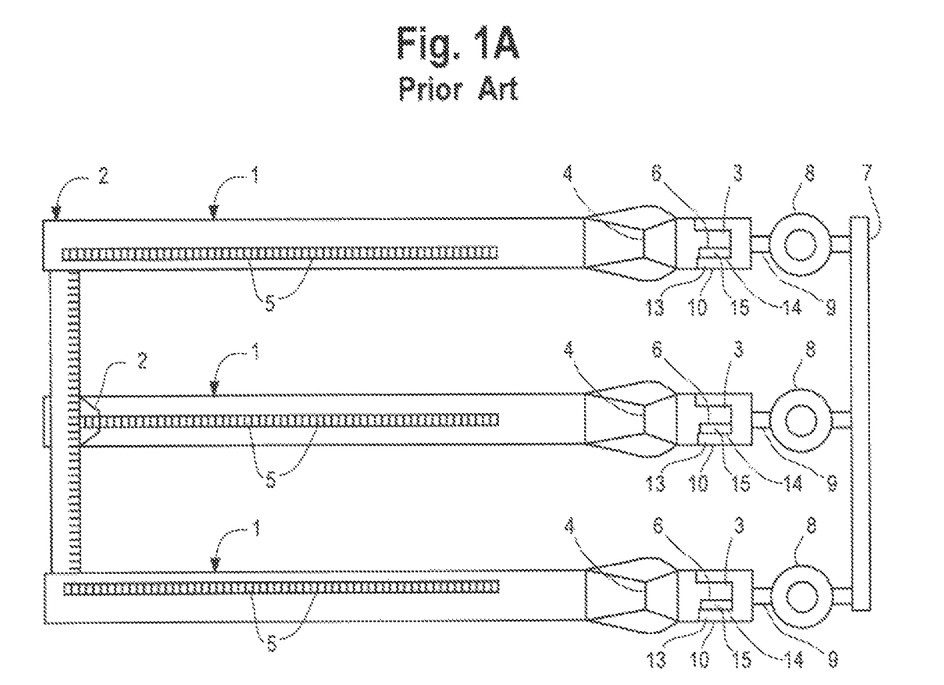
FIG. 1A is a top schematic view of a typical prior art burner assembly, including burner tubes, air shutters and gas control valves.

Burner tube assemblies, including those used in gas grills, are common in the art. A typical configuration of a burner assembly may be seen generally in FIG. 1A (see also U.S. Pat. No. 6,102,029, assigned to Weber-Stephen Products LLC). As shown, such an assembly typically includes a plurality of elongated hollow burner tubes 1, each burner tube 1 having a closed end 2, an open or inlet end 3, as well as a venturi region 4. A plurality of gas ports 5 are provided along the length of the burner tube 1. The open end 3 of burner tube 1 may be provided with a cut-out section 6 that aids in the introduction of combustion air into the burner tube 1.

To distribute the fuel to be burned to the burner tubes 1, a gas distribution manifold 7 is provided. A plurality of gas control valves 8 to selectively control the amount of fuel delivered in the burner tubes 1 are in fluid communication with the manifold 7 and with each burner tube 1 through a valve including a valve neck 9. The valve neck 9 includes a nozzle 18 at its end (not shown in FIG. 1A) to inject the gas into the open end 3 of burner tubes 1. The majority of the burner tube assembly, and particularly that portion rearward of valve neck 9, is located within the fire box of the gas grill. As a result, the burner tubes are subject to wide temperature fluctuations and the expansion and contraction of the burner tubes must be accommodated, as discussed below.

Figure 1B:
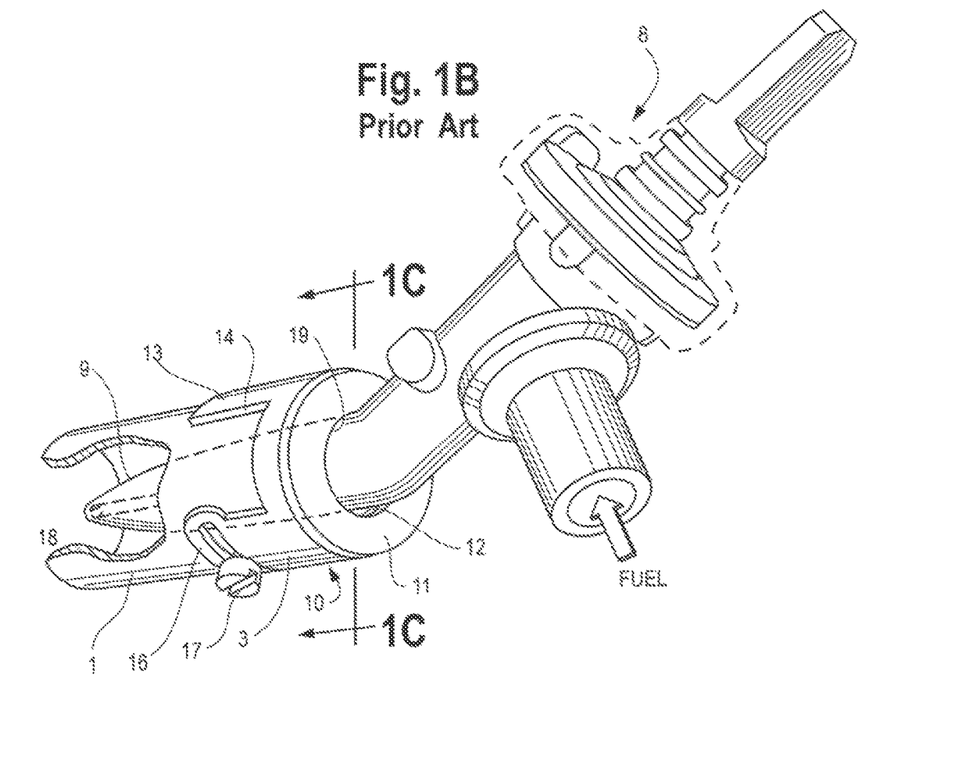
FIG. 1B is a perspective view of a typical prior art air shutter, shown engaged with the burner tube and the neck of the gas control valve.

An air shutter 10 is also included on each burner tube 1 in a typical burner tube assembly. A typical sleeve-type air shutter 10, valve neck 9 and burner tube 1 are also shown in FIG. 1B (see also U.S. Pat. No. 4,416,249). Air shutter 10 includes a face 11 having an opening 12, the shape of which coincides with the cross-sectional shape of valve neck 9. Similarly, the shape of the air shutter 10 generally coincides with the shape of the open end of burner tube 1. Air shutter 10 also includes a rearwardly projecting sleeve or skirt 13, typically including at least one aperture or window 14. The skirt 13 of air shutter 10 is slip fit over the open end 3 of burner tube 1. In this manner, air shutter 10 may be rotated around the open end 3 of burner tube 1 such that an air gap 15 (see FIG. 1A) may be created by varying the alignment of window 14 on the air shutter 10 with the cut-out section 6 of the open end 3 of burner tube 1. The amount of air mixed with gas may thus be adjusted.

Figure 1C:
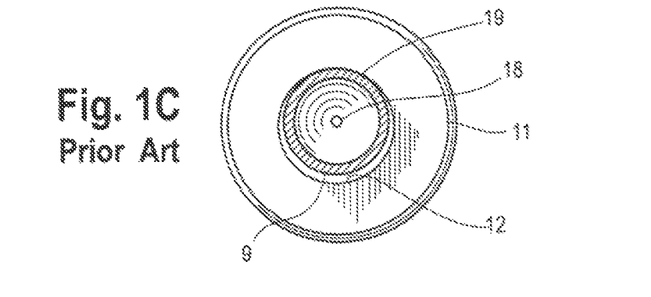
FIG. 1C is a front plan view of a typical prior art shutter shown engaged with the valve neck of a gas control valve and showing a single area of contact and a gap between the neck and air shutter, taken along line 1C-1C of FIG. 1B.

As shown in FIGS. 1B and 1C, the central opening 12 on the face 11 of air shutter 10 receives the valve neck 9 and is supported thereby. Control valve 8 and valve neck 9 are rigidly secured to the grill and/or grill frame assembly (not shown). Because the burner tube 1 expands and contracts during heating and cooling, air shutter 10 is not rigidly secured to valve neck 9, which simply protrudes through the central opening 12 and supports the air shutter 10 and thus, burner tube 1. The closed end 2 of burner tube 1 is also typically movably attached to a bracket or other portion of the fire box at the rear of a grill. As a result, the burner tube 1 is able to expand and contract during use without damage to it, the valve or other grill components.

While such a typical configuration is satisfactory for many purposes, there are certain drawbacks. For example, and as best shown in FIG. 1C, because of the loose fit between the valve neck 9 and the central opening 12 of the air shutter, there is typically only one point or area of contact 19 between the two components. This limited point of contact 19 can negatively impact the operation of a typical ignition system or igniter 40, especially if there is debris, corrosion or the like between the valve neck 9 and central opening 12. In addition, and for similar reasons, the nozzle 18 at the end of the valve sleeve 9 is not centrally aligned with the interior center of the burner tube 1, also as shown in FIGS. 1B and 1C. This can result in decreased efficiency of fuel usage and impact the quality of the resultant flame.

SUMMARY OF THE INVENTION

In general, the gas inlet fixtures of the present inventions are used with typical burner tubes and gas valves of gas grills and may also function as air shutters. The present inventions preserve the advantages of known air shutters and also provide new features and advantages, some of which are described or are apparent.

In accordance with a preferred embodiment of the present inventions, a burner assembly for a gas grill is provided. It includes at least one substantially hollow burner tube having an open end, a closed end and a length, the length of the burner tube having a series of gas outlet ports; and at least one gas control valve, the control valve having a neck and a gas orifice or nozzle at the end of the valve neck. Also provided is at least one gas inlet fixture, the gas inlet fixture including a face member and a generally rearwardly projecting skirt member which is generally perpendicular to the face, wherein the face has a central opening and a plurality of rearwardly projecting tabs extending from the face around the perimeter of the central opening. In a preferred embodiment, the central opening of the face of the gas inlet fixture is inserted over the neck of the control valve and is slidably secured to the neck by the rearwardly projecting tabs. Each tab creates a positive point of contact with the valve neck. In addition, because of the multiple positive points of contact, the gas orifice is also centered in the burner tube. The skirt of the gas inlet fixture may further include a window and the open end of the burner tube may contain an aperture, such that a gap formed between the window of the gas inlet fixture and the aperture of the burner tube may be adjusted to determine and/or adjust the gas to air mixture.

A gas inlet fixture for use on a gas burner tube in conjunction with a gas control valve, the burner tube having an open end, a length and a cross-section and the gas control valve having a neck and a gas orifice at the end of the neck is provided by the present inventions. The preferred gas inlet fixture includes a face generally perpendicular to the cross-section of the open end of the burner tube, the face having a central opening and at least two tabs adjacent to the central opening and projecting generally rearward from the face.

Also provided is a rearwardly projecting skirt which is generally perpendicular to the face, the skirt being adapted to engage (or be engaged by) the open end of the burner tube. The skirt may also include a window. In a preferred embodiment, the at least two tabs adjacent to the central opening of the face slidingly engage the valve neck of the control valve to provide a friction fit and multiple points of contact between the tabs and the neck of the control valve in order to accommodate the expansion and contraction of the burner tube. The skirt of the gas inlet fixture may also include an adjustment slot such that the position of the window may be secured in position relative to the burner tube with a fastener through said slot.

The present inventions further provide a burner assembly for a gas grill having a gas distribution manifold in fluid communication with a gas source; at least one gas control valve in fluid communication with the gas distribution manifold, the control valve including a neck terminating in a gas nozzle; and, at least one substantially hollow burner tube having an open end, a closed end and a series of gas orifices between the open and closed ends. At least one gas inlet fixture is also provided. The gas inlet fixture includes a face member and a rearwardly projecting skill member which is generally perpendicular to the face, the skirt member engaging (or capable of being engaged by) the open end of the burner tube, the face including a central opening to receive the neck of the control valve and including a plurality of rearwardly projecting tabs to engage the valve neck, wherein the gas inlet fixture substantially centers the gas nozzle with the center of the burner tube. An ignition system cooperating with the burner tube to ignite the gas may also be provided. The skirt of the gas inlet fixture may also include a window and the open end of the burner tube may include an aperture such that a gap may be created between the window and the aperture by rotating the gas inlet fixture a desired amount.

Other embodiments of the present inventions provide a gas inlet fixture for use with a gas burner tube in conjunction with a gas control valve, the gas control valve having a neck and a gas orifice, the burner tube having an open end, a length and a cross-sectional shape. The gas inlet fixture includes a face generally perpendicular to the longitudinal axis of the open end of the burner tube, the face having a central opening and at least two tabs adjacent to the central opening and projecting generally rearward from the face. In addition, a plurality of rearwardly projecting flanges generally perpendicular to the face, the flanges adapted to cooperate with the open end of the burner tube; and, wherein the tabs of the central opening slidably engage the neck of the control valve to provide positive contact with and a friction fit between the tubs and the neck of the control valve to accommodate the expansion and contraction of the burner tube along the neck of the control valve are also provided. A securing member may be provided to secure the gas inlet fixture to the burner tube. In addition, inverted v-shaped members may be provided to the gas inlet fixture to function as a venturi within the burner tube. In a preferred embodiment, three tabs are provided and/or two rearwardly projecting flanges may be provided.

Accordingly, it is an object of the present invention to provide u gas inlet fixture that has multiple points of positive contact with the control valve and/or the neck of the control valve.

It is another object of the present invention to provide a gas inlet fixture that enables an improved electrical connection between the burner tube and the control valve.

It is an additional object of the present invention to provide a gas inlet fixture that is capable of substantially centering the gas nozzle within the substantial center of the burner tube such that gas is injected down the center of the burner tube.

It is a further object of the present invention to provide an adjustable gas inlet fixture that centers the gas nozzle with the substantial center of the burner tube.

It is yet another object of the present invention to provide a gas inlet fixture that has one or more rearwardly projecting tabs (which may or may not be spring-like) to engage the control valve and/or the neck of the control valve.

It is still another object of the present invention to provide an adjustable gas inlet fixture that permits the expansion and contraction of the burner tube, yet provides multiple points of contact between the gas inlet fixture and valve neck.

It is still yet another object of the present invention to provide a gas inlet fixture that also functions as an air shutter.

It is still yet an additional object of the present invention to provide a gas inlet fixture that may be used with burner tubes having a non-circular cross-section.

It is still a further object of the gas inlet fixture of the present invention to provide increased flame quality and maximize fuel efficiency.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

INVENTOR'S DEFINITION OF THE TERMS

The following terms which may be used in the various claims and/or specification of this patent are intended to have their broadest meaning consistent with the requirements of law:

As used herein, "burner tube" shall mean the structure that receives the gas/air mixture and feeds that mixture to a series of outlet ports along its length for ultimate ignition. Burner tubes are often circular in cross-section, although other cross-sectional shapes, such as ovals, squares, rectangles and the like, have been used and are contemplated herein for use with the present inventions.

As used herein, "ignition system" shall mean devices that are capable of generating sparks to ignite the fuel/air mixture emitted from the outlet ports of the burner tube. Such devices include piezo ignition as well as battery operated spark generators.

As used herein, "front" or "forward" is used by reference to the front or toward the front of a typical gas grill, which usually includes a control panel, gas control valves, control knobs, etc.

As used herein, "rear" or "rearward" is used in reference to the back or toward the back of a typical gas grill.

Where alternative meanings are possible, in either the specification or claims, the broadest meaning is intended consistent with the under standing of those of ordinary skill in the art. All words used in the claims are intended to be used in the normal, customary usage of grammar, the trade and the English language.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The gas inlet fixtures 20 of the present inventions are used in conjunction with typical burner assemblies located in the cooking chamber or fire box of a gas barbecue grill to, among other things, improve flame quality and aid in the proper ignition of the flame. In the past, a variety of air shutters 10 have been used, including those shown in FIGS. 1A, 1B and 1C to, among other things, attach the burner tube 1 to the gas valves 8. As previously discussed, a gas manifold 7 distributes the gas to a number of gas control valves 8 that are usually part of the burner assembly. The gas control valves 8 typically found at the front of the grill include a valve neck 9 that projects toward the rear of the grill. The end of the valve neck 9 includes a nozzle 18 through which the gas is injected into the inside of burner tube 1. The air shutter 10 is slip fit onto the valve neck 9 through an opening 12 in the face 11 of the shutter 10. The air shutter 10, which includes an aperture 14, is secured to the open end 3 of the burner tube 1, which includes a cut-out section 6. By rotating the air shutter 10, an air gap 15 that is adjustable in size is created by the alignment of aperture 14 in relation to cut-out section 6. Once properly adjusted, the air shutter is then fixed in relation to the burner tube using a set screw 17 through a slot 16 in the skirt 13 of the air shutter 10. In this manner, the air-fuel mixture may be adjusted depending upon the type of fuel being used, the burner tube configuration, and the like. There are other ways to effect the adjustment, such as by an air shutter 10 that slides along the length of the open end of the burner tube 1. The closed end 2 of burner tube 1 is typically attached to a bracket or other member toward the rear of the grill.

Because of the intense heat generated by the combustion of gas and the burner tube 1 during use, it is necessary for the burner tube 1 to be able to expand and contract inside the fire box. At the same time, however, the gas control valves 8 are rigidly secured to the exterior front of the grill through brackets and/or a control panel. Thus, expansion and contraction of the burner tube is accomplished by a slip fit between the valve neck 9 and the opening 12 on the face 11 of air shutter 10 as shown in FIGS. 1B and 1C. Specifically, as best shown in FIG. 1C, the diameter of the opening 12 is greater than the diameter of the valve neck 9. Thus, the air shutter 10 and the attached burner tube 1 are able to slide along valve neck 9 during expansion and contraction. This gap or space leads to various drawbacks that are solved by the present inventions.

Figures 7, 8, 9:
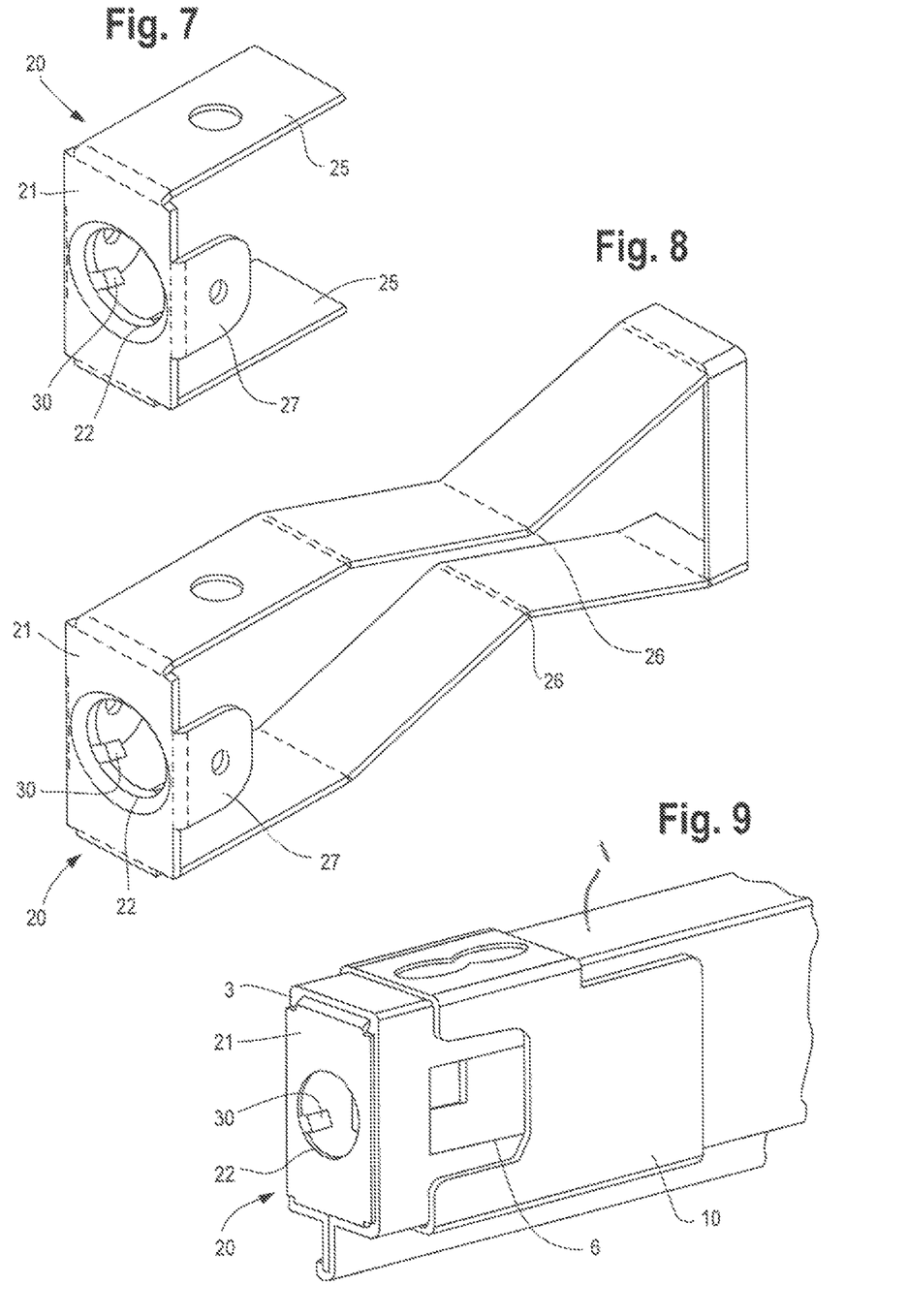
FIG. 7 is a perspective view of an alternative embodiment of a preferred gas inlet fixture of the present invention.
FIG. 8 is a perspective view of another alternative embodiment of a gas inlet fixture of the present invention that may also function as a venturi within a burner tube.
FIG. 9 is a perspective view of the embodiment of the gas inlet fixture of FIG. 7 or FIG. 8 shown installed on a burner tube having a non-circular cross-section.

The preferred embodiments of FIGS. 2-6 are described in relation to a gas valve neck 9 having a substantially circular cross-section and a typical, known burner tube 1 having a substantially circular cross-section. It will be understood by those of skill in the art that other cross-sectional shapes of these components, such as square, rectangular or ovoid, may be used and are within the scope of the inventions. The embodiments shown in FIGS. 2-6 also function as an air shutter, although that function is not required by the present invention. Alternative preferred embodiments are shown in FIGS. 7-9. In these embodiments, the gas inlet fixture 20 is for use with a burner tube 1 having a rectangular cross-section. In addition, the embodiments shown in FIGS. 7-9 do not function as an air shutter 10. However, it will be understood by those of skill in the art that they may be modified to function as an air shutter if desired.

Figure 3:
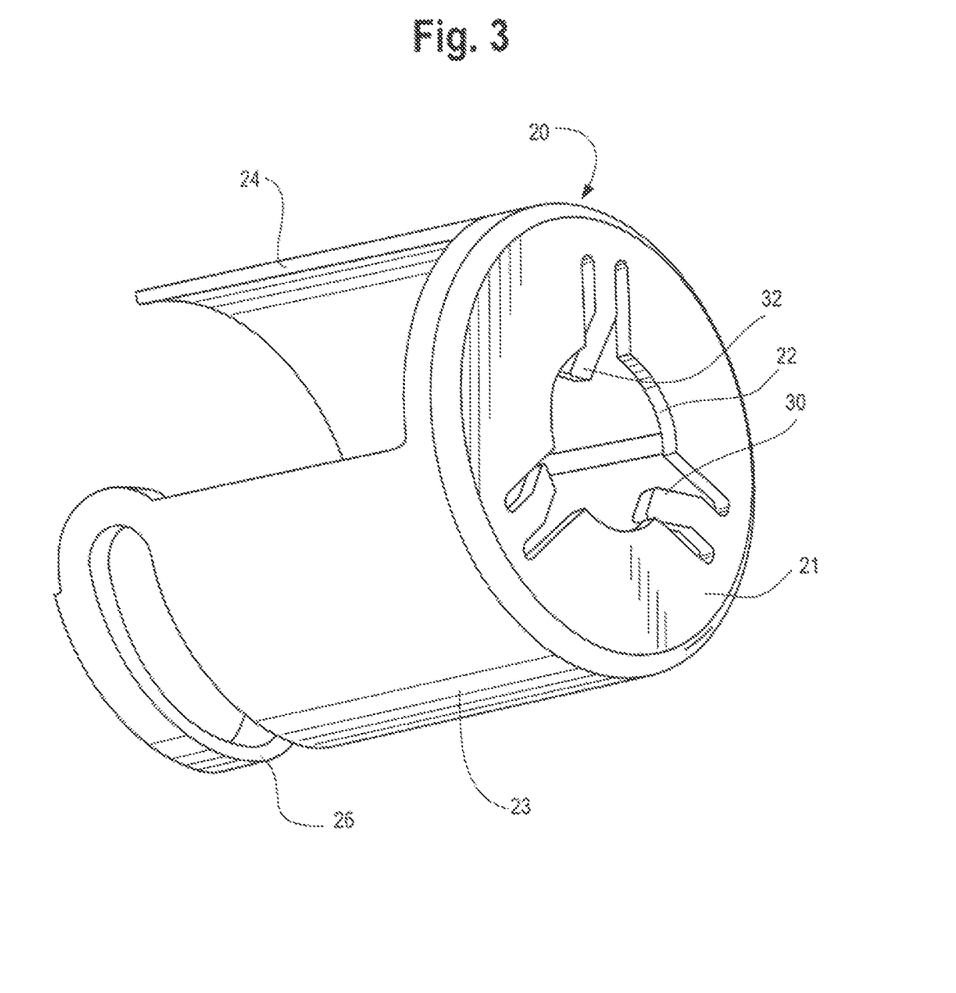
FIG. 3 is a perspective view of a preferred embodiment of the gas inlet fixture of FIG. 2A.
Figure 4:
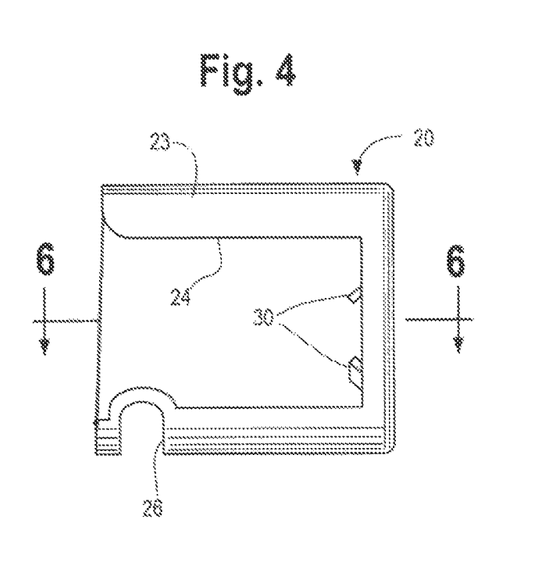
FIG. 4 is a side perspective view of the preferred gas inlet fixture of FIG. 2A.

One preferred embodiment of the gas inlet fixture of the present inventions is shown as 20 in FIG. 3. Gas inlet fixture 20 includes a generally flat face 21 and a rearwardly projecting skirt 23 which is generally perpendicular to face 21. A window or aperture 24 is also provided on skirt 23. A slot 26 on skirt 23, which is used to secure the air shutter 20 to the burner tube 1 after adjustment to create air gap 15, may also be provided. It will be understood by those of skill in the art that skirt 23 may be formed from the same piece of material as face 21, or they may be separate components attached together. A generally central opening 22 is provided on face 20. The size and shape of the opening 22 is designed to mate with the cross-sectional size and shape of valve neck 9. Similarly, skirt 23 is designed to mate with the open end 3 of burner tube 1 such that it engages (or is engaged by) open end 3. It will be understood by those of skill in the art that the shape of the central opening 22 and the valve neck 9 do not necessarily have to be the same as the cross-sectional shape of the skirt 23 and open end 3 of the burner tube 1.

Figure 5:
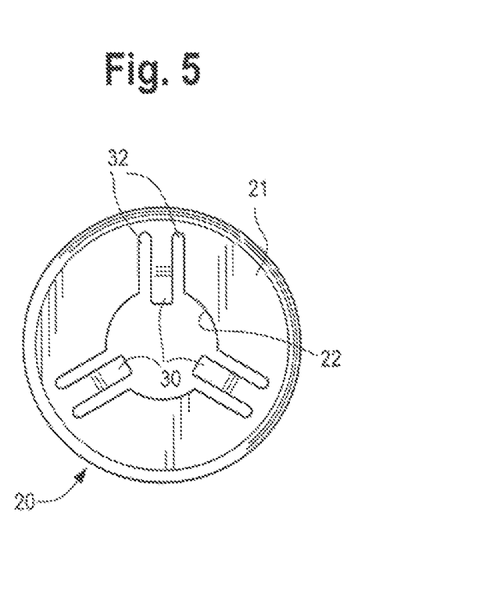
FIG. 5 is a front perspective view of the face of the preferred air gas inlet fixture of FIG. 2A.
Figure 6:
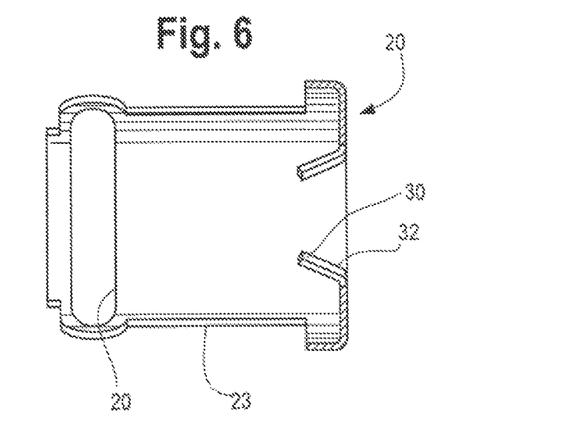
FIG. 6 is a cross-sectional view of the gas inlet fixture of FIG. 2 taken along line 6-6 of FIG. 4.

A plurality of rearwardly projecting tabs 30 are provided around the perimeter of central opening 22. In the preferred embodiment, tabs 30 are formed from the material from face 21. The tabs 30 are designed to engage valve neck 9, while at the same time permitting the gas inlet fixture 20 and burner tube 1 to which it is attached to move along the longitudinal axis of valve neck 9 during expansion and contraction. Through the use of tabs 30, there are multiple points of contact 19 and the gap between the neck and central opening 22 eliminated as shown in FIG. 2B. As shown in FIGS. 3 and 5, tabs 30 may be formed in face 21 by removing material 32 from each side of tab 30 and bending the tab 30 rearwardly. The tabs 30 project generally rearwardly and typically at an angle, and will slightly constrict the central opening 22 so that they may positively, yet movably engage valve neck 9. In a preferred embodiment, there are three tabs 30. It will be understood by those of skill in the art that only two, or more than three, tabs 30 may be provided. In addition, it will also be understood that tabs 30 do not have to be formed from the material of face 21. For example, clips or similar members (not shown) may be attached to central opening 22 and engage valve neck 9.

Figure 2A:
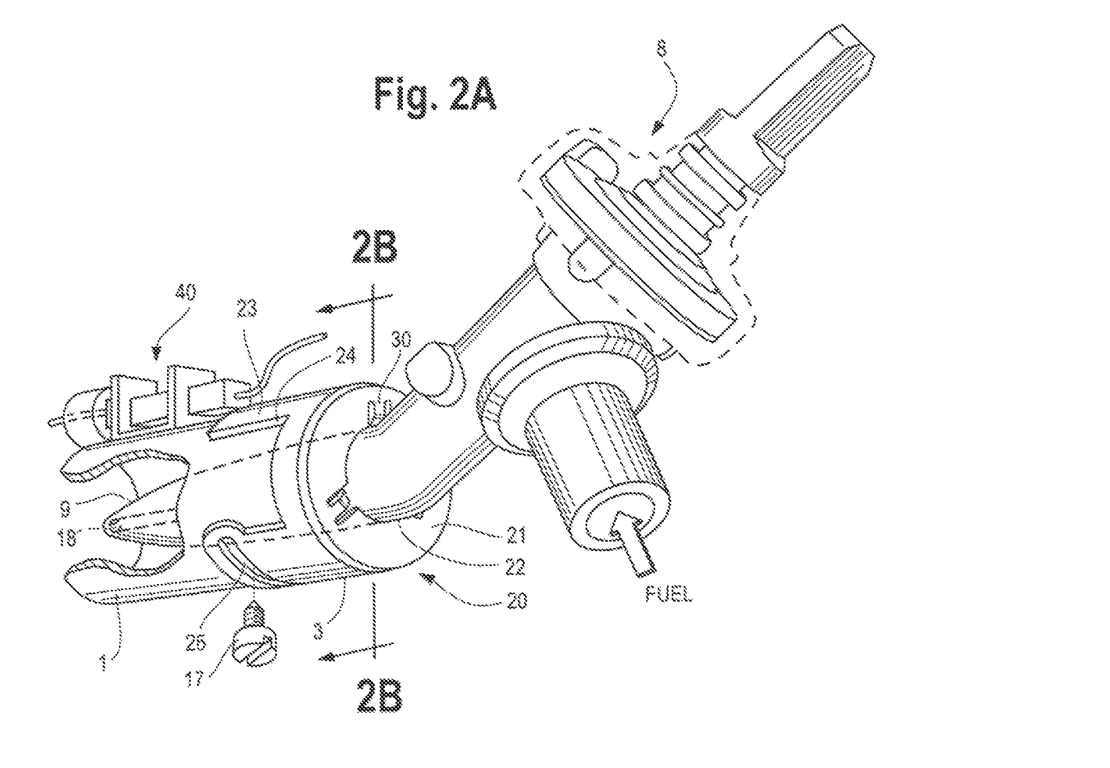
FIG. 2A is a perspective view of a preferred embodiment of the gas inlet fixture of the present inventions, shown on a typical burner tube and positioned on a typical valve neck of a typical gas valve and including a typical igniter and which also functions as an air shutter.
Figure 2B:
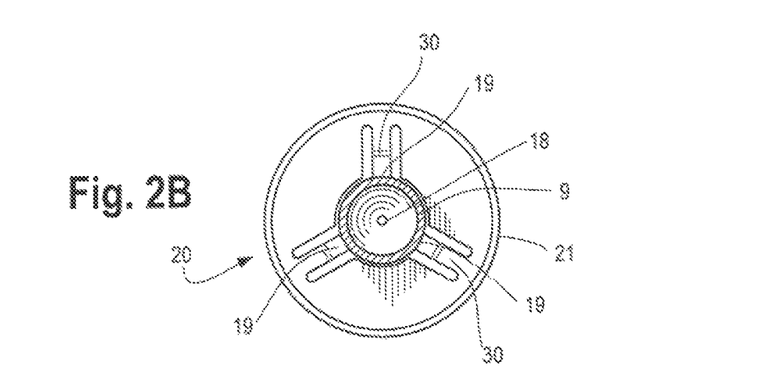
FIG. 2B is a front plan view of a preferred gas inlet fixture of the present invention shown positioned on the valve neck of a gas control valve and showing at least three points of contact and the centering of the gas nozzle with the center of the burner tube, taken along line 2B-2B of FIG. 2A.

The use, operation and advantages of these embodiments of the present inventions may be seen by reference to FIGS. 2A and 2B. Gas inlet fixture 20 is shown engaging the exterior of the open end 3 of burner tube 1. Alternatively, it will be understood by those of skill in the art that skirt 23 may fit within open end 3 (see e.g., FIG. 9). The central opening 22 of face 21 is inserted over valve neck 9, which is engaged by tabs 30 around its circumference. Because of the positive points of contact 19 between tabs 30 and valve neck 9, any provided ignition system will provide better and more reliable sparking by ignitor 40 (sec FIG. 2A). At the same time, the gas inlet fixture 20 is free to move along the valve neck 9 to accommodate expansion of burner tube 1. Similarly, because tabs 30 center valve neck 9 with the gas inlet fixture 20 and the center of burner tube 1, gas is injected from the gas orifice or nozzle 18 into the center of burner tube 1. This creates, among other things, better combustion and flame quality. Gas inlet fixture 20 may be secured in the desired position to the open end 3 of burner tube 1 using a set screw 17 through slot 26 to create the appropriate air gap 15 and thus function as an air shutter.

A non-circular preferred embodiment of the present inventions to be used with non-circular burner tubes 1 may be seen by reference to FIGS. 7-9. As shown in FIG. 7, gas inlet fixture 20 includes a rectangular face 21 and two rearwardly projecting flanges 25 which are generally perpendicular to face 21. In these embodiments, flanges 25 are provided instead of skirt 23. It will be understood by those of skill in the art that skirt 23 may be replaced with a flange or flanges 25 in the circular embodiment, especially when gas inlet fixture 20 does not function as an air shutter. Like skirt 23, flanges 25 may be formed from the same piece of material as face 21 or may be separate components attached thereto.

A central opening 22 is also provided, the shape of which is designed to mate with valve neck 9. A plurality of rearwardly projecting tabs 30 are provided around the perimeter of central opening 22. Tabs 30 engage valve neck 9 with multiple points of contact 19 and also permit gas inlet fixture 20 and burner tube 1 to move along the longitudinal axis of valve neck 9 during expansion and contraction. The formation, number and angle of tabs 30 are the same as described for the embodiments of FIGS. 2-6. A securing member 27 may also be provided to attach gas inlet fixture 20 to the open end 3 of burner tube 1. FIG. 8 shows an embodiment of gas inlet fixture 20 wherein the rearwardly projecting flanges 25 include v-shaped members 26 so that gas inlet fixture 20 may function as a venturi as will be understood by those of skill in the art.

As shown in FIG. 9, gas inlet fixture 20 is inserted into the open end 3 of rectangular burner tube 1. Valve neck 9 is inserted into central opening 22 (not shown) and is slidably engaged by rearward tabs 30. In this manner, there are multiple positive points of contact 19 that help center the flow of gas into the center of the burner tube and also aid with the ignition of the fuel by igniter 40. An independent air shutter 10 may also be provided, as will be understood by those of skill in the art.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions us described and claimed.

Various features of the present inventions are set forth in the following claims.

What is claimed is:

1. A burner assembly for a gas grill, comprising:
   at least one substantially hollow burner tube having an open end, a closed end and a length, the length of the burner tube having a series of gas outlet ports;
   at least one gas control valve, the control valve having a neck and a gas nozzle at the end of the neck; and,
   at least one gas inlet fixture, the gas inlet fixture including a face member and a generally rearwardly projecting skirt member which is generally perpendicular to the face, wherein the face has a central opening and a plurality of rearwardly projecting tabs extending from the face around the perimeter of the central opening, wherein the central opening of the face of the gas inlet fixture is inserted over the neck of the control valve and is slidably secured to the neck by the rearwardly projecting tabs.

2. The burner assembly of claim 1 wherein the gas nozzle is centered in the burner tube by the tabs.

3. The burner assembly of claim 2 wherein the skirt of the gas inlet fixture includes a window and the open end of the burner tube contains an aperture, such that an adjustable gap may be formed between the window and the aperture to determine the gas to air mixture.

4. A gas inlet fixture for use on a gas burner tube in conjunction with a gas control valve, the burner tube having an open end, a length and a cross-section and the gas control valve having a neck and a gas orifice, the gas inlet fixture comprising:
   a face generally perpendicular to the longitudinal axis of the open end of the burner tube, the face having a central opening and at least two tabs adjacent to the central opening and projecting generally rearward from the face;
   a rearwardly projecting skirt generally perpendicular to the face, the skirt adapted to engage the open end of the burner tube, the skin including a window; and,
   wherein the tabs of the central opening slidably engage the neck of the control valve to provide positive contact with and a friction fit between the tabs and the neck of the control valve such that the gas inlet fixture is free to move longitudinally along the neck of the control valve to accommodate the expansion and contraction of the burner tube along the neck of the control valve, and wherein the tabs of the central opening substantially centers the neck of the control valve with the center of the burner tube.

5. The gas inlet fixture of claim 4 wherein the skirt is provided with an adjustment slot such that the position of the window may be secured to the burner tube with a fastener.

6. A burner assembly for a gas grill, comprising:
a gas distribution manifold in fluid communication with a gas source;
at least one gas control valve in fluid communication with the gas distribution manifold, the control valve including a neck terminating in an end having a gas nozzle;
at least one substantially hollow burner tube having an open end, a closed end and a series of gas orifices between the open and closed ends;
at least one gas inlet fixture having a face member and a plurality of generally rearwardly projecting flanges generally perpendicular to the face, the flanges engaging (or being engaged by) the open end of the burner tube, the face including a central opening to receive the neck of the control valve and an inclined frustoconical portion around the central opening connecting the face and the rearwardly projecting flanges, the face further including a plurality of rearwardly projecting tabs to provide positive contact with and friction fit to engage the neck, wherein the gas inlet fixture substantially centers the gas nozzle with the center of the burner tube; and,
an ignition system cooperating with the burner tube to ignite the gas.

7. The burner assembly of claim 6 wherein the skirt of the gas inlet fixture includes a window and the open end of the burner tube includes an aperture, such that a gap may be created between the window and the aperture by rotation of the gas inlet fixture.

* * * * *